(12) United States Patent
Brockschnieder et al.

(10) Patent No.: US 7,390,059 B2
(45) Date of Patent: Jun. 24, 2008

(54) VEHICLE SEAT

(75) Inventors: Dagmar Brockschnieder, Rietberg (DE); Silvia Krömer, Follhagen (DE); Benno Kauls, Warmsen (DE)

(73) Assignee: Faurecia Autositze GmbH & Co. KG, Stadthagen (DE)

( * ) Notice: Subject to any disclaimer, the term of this patent is extended or adjusted under 35 U.S.C. 154(b) by 0 days.

(21) Appl. No.: 11/387,979

(22) Filed: Mar. 24, 2006

(65) Prior Publication Data

US 2006/0214485 A1    Sep. 28, 2006

(30) Foreign Application Priority Data

Mar. 24, 2005    (DE)    .................. 10 2005 013 613

(51) Int. Cl.
    *A47C 31/00* (2006.01)
(52) U.S. Cl. ............... 297/228.13; 297/229.1; 297/452.62; 297/452.6
(58) Field of Classification Search ............ 297/452.6, 297/452.62, 228.13, 229.1, 229
    See application file for complete search history.

(56) References Cited

U.S. PATENT DOCUMENTS

| 1,853,579 | A |   | 4/1932  | Sallop |
|-----------|---|---|---------|--------|
| 4,047,756 | A | * | 9/1977  | Ney ............................ 297/219.1 |
| 4,317,591 | A | * | 3/1982  | Ramsey ..................... 297/452.6 |
| 4,798,416 | A | * | 1/1989  | Faust et al. ................ 297/452.62 |
| 5,601,332 | A | * | 2/1997  | Schultz et al. ............. 297/216.13 |
| 5,820,214 | A | * | 10/1998 | Bessette et al. ............ 297/228.13 |
| 6,003,939 | A | * | 12/1999 | Nakai et al. ................ 297/216.13 |
| 6,079,779 | A | * | 6/2000  | Tanaka et al. .............. 297/228.13 |
| 6,283,552 | B1 |  | 9/2001  | Halse et al. |
| 7,128,371 | B2 | * | 10/2006 | Kawasaki et al. ......... 297/284.2 |

FOREIGN PATENT DOCUMENTS

| DE | 42 19 891    A1 | 12/1993 |
| DE | 195 10 789   A1 | 9/1996  |
| DE | 694 08 966   T2 | 7/1998  |
| DE | 197 34 408   A1 | 2/1999  |
| DE | 298 22 649   U1 | 5/1999  |

(Continued)

OTHER PUBLICATIONS

U.S. Appl. No. 10/358,326, filed Feb. 2003.

(Continued)

*Primary Examiner*—Sarah B McPartlin
(74) *Attorney, Agent, or Firm*—Shlesinger, Arkwright & Garvey LLP (57) ABSTRACT

Vehicle seat with a cushion body and a cover attached thereto that includes at least one medallion cover piece and at least one side cushion cover piece, which are attached to one another at the attachment points. At the attachment points a groove is provided in the cushion body. Vehicle seat of this type that makes it possible not only for a manufacturer but also for a consumer, namely an automobile owner or driver, to individually configure a seat. The medallion cover piece and the side cushion cover piece are attached to one another by use of a slide fastener that is integrated into the attachment. The side cushion cover piece can be separably hooked into the structure of the vehicle seat at its end that is opposite the slide fastener.

9 Claims, 7 Drawing Sheets

FOREIGN PATENT DOCUMENTS

| | | |
|---|---|---|
| DE | 199 49 423 C1 | 1/2001 |
| DE | 201 09 719 U1 | 9/2001 |
| DE | 100 34 088 A1 | 1/2002 |
| DE | 101 31 718 C1 | 1/2003 |
| EP | 0 103 679 | 3/1984 |
| EP | 0 649 619 A1 | 4/1995 |
| EP | 1 577 157 A2 | 9/2005 |
| WO | 99/05001 | 2/1999 |

OTHER PUBLICATIONS

U.S. Appl. No. 11/213,738, filed Aug. 2005.
U.S. Appl. No. 11/230,925, filed Sep. 2005.
U.S. Appl. No. 11/238,963, filed Sep. 2005.
U.S. Appl. No. 11/284,898, filed Nov. 2005.
U.S. Appl. No. 11/299,747, filed Dec. 2005.
U.S. Appl. No. 11/328,192, filed Jan. 2006.
U.S. Appl. No. 11/346,313, filed Feb. 2006.
German Office Action dated Feb. 20, 2006 in German Application No. 10 2005 013 613.3-16, filed Mar. 24, 2005 (3 pages).
German Office Action dated Feb. 17, 2006 in German Application No. 10 2005 012 320.1-16, filed Mar. 17, 2005 (3 pages).

* cited by examiner

VEHICLE SEAT

CROSS-REFERENCE TO RELATED APPLICATION

This application claims priority of German Application No. 10 2005 013 613.3, filed Mar. 24, 2005, and which is incorporated herein by reference.

This application relates to previously filed U.S. application Ser. No. 11/377,335 to Brockschnieder et al., filed Mar. 17, 2006.

FIELD OF THE INVENTION

The invention relates to a vehicle seat. More particularly, the invention relates to a vehicle seat having a cushion body, a cover being attached to the cushion body, and a medallion cover piece. Even more particularly, the invention relates to a vehicle seat having a side cushion cover piece, the medallion cover piece is attached to the side cushion cover piece at attachment points, and a groove is provided in the cushion body at the attachment points.

BACKGROUND OF THE INVENTION

A vehicle seat of this type is known from DE 101 31 718 C1. Here the cushion body may refer to the cushion support pad for either a seat or a backrest. Prior to its attachment to the cushion body, the cover is made up of separate cover sections, usually a cover section for the front surface of the backrest or the surface of the seat, the so-called medallion, and cover sections for the padded side sections that border the backrest and seat surfaces. In order to allow the cover to be fastened to the cushion body, the above-named cover sections are sewn together at the points where they meet, wherein a first fastening element is integrated by being sewn in. A second fastening element is arranged, in a tight connection, at the base of a groove provided at the fastening points in the cushion body. The first and second fastening elements comprise complementary profiled elements, which, in order to fasten the cover to the cushion body, are pressed into one another, which causes them to become hooked together. The cover is thereby fastened to the cushion body.

In EP 0 103 679 B1 a backrest for a vehicle seat is described, in which a support element made of rigid foam, the front of which is covered with a cushion body, is arranged between the longitudinal crossbars of the seat. In order to be able to adjust the longitudinal profile of the backrest at the level of the lumbar support and of the upper pelvic rim, a molded body made of rigid foam is provided, which can be inserted into a recessed area in this region of the support element. To adjust the longitudinal profile, this molded body is inserted in a rotated position, or is replaced by a different molded body. To gain access to the molded body, the cushion body can be folded forward and upward. For this purpose it has a fold line in its upper region that is formed by a transverse seam, and in its lower area it is separably attached by means of an adhesive fastening element or some other type of fastening element, for example a slide fastener, to the support element. Along its two side edges, the cushion body is not attached to the support element.

In U.S. Pat. No. 6,283,552 B1 and DE 201 09 719 vehicle seats are disclosed in which cushion sections, for example padded side sections, can be clipped to the structure of the seat.

OBJECTS AND SUMMARY OF THE INVENTION

An object of the present invention is to provide a generic vehicle seat that will make it possible for not only the manufacturer but also the consumer, namely the automobile owner or driver, to individually configure a seat.

This object is achieved according to the invention with a vehicle seat having a cushion body, a cover being attached to the cushion body, and a medallion cover piece. A side cushion cover piece is provided, and the medallion cover piece is attached to the side cushion cover piece at attachment points. A groove is provided in the cushion body at the attachment points. The medallion cover piece and the side cushion cover piece are attached to one another by use of a slide fastener integrated into the attachment, and the side cushion cover is separably hookable into a structure of the vehicle seat at an end opposite the slide fastener.

Because the cover piece for the side cushions is attached by use of fastening elements that can be easily and rapidly unfastened, namely on one side via a slide fastener to the medallion cover piece and on the other side via a hook connector to the seat structure, it can be exchanged as needed in an uncomplicated process, even by someone who is not a technician. One case in which this would be necessary would be to change the look of the seat, which could be achieved by using different colored cover pieces or cover pieces having a different quality or surface form. In addition to these purely aesthetic modifications, worn-out cover pieces for the side cushions, which are subject to particular wear and tear due to entry and exit from the vehicle, can be easily replaced.

With this inventive solution, however, it is possible not only to replace the cover pieces for the side cushions, but also to alter the shape and hardness of the side cushions. To accomplish this it is necessary for a complete cushion body for the side section or a structure for a side cushion body that is already present to be foamed-in behind the side cushion cover piece.

Further advantageous embodiments of the invention are set forth below.

Relative terms such as left, right, up, and down are for convenience only and are not intended to be limiting.

Below, the invention will be described in greater detail with reference to exemplary embodiments. The attached set of drawings shows:

DETAILED DESCRIPTION OF THE INVENTION

Figure 1:
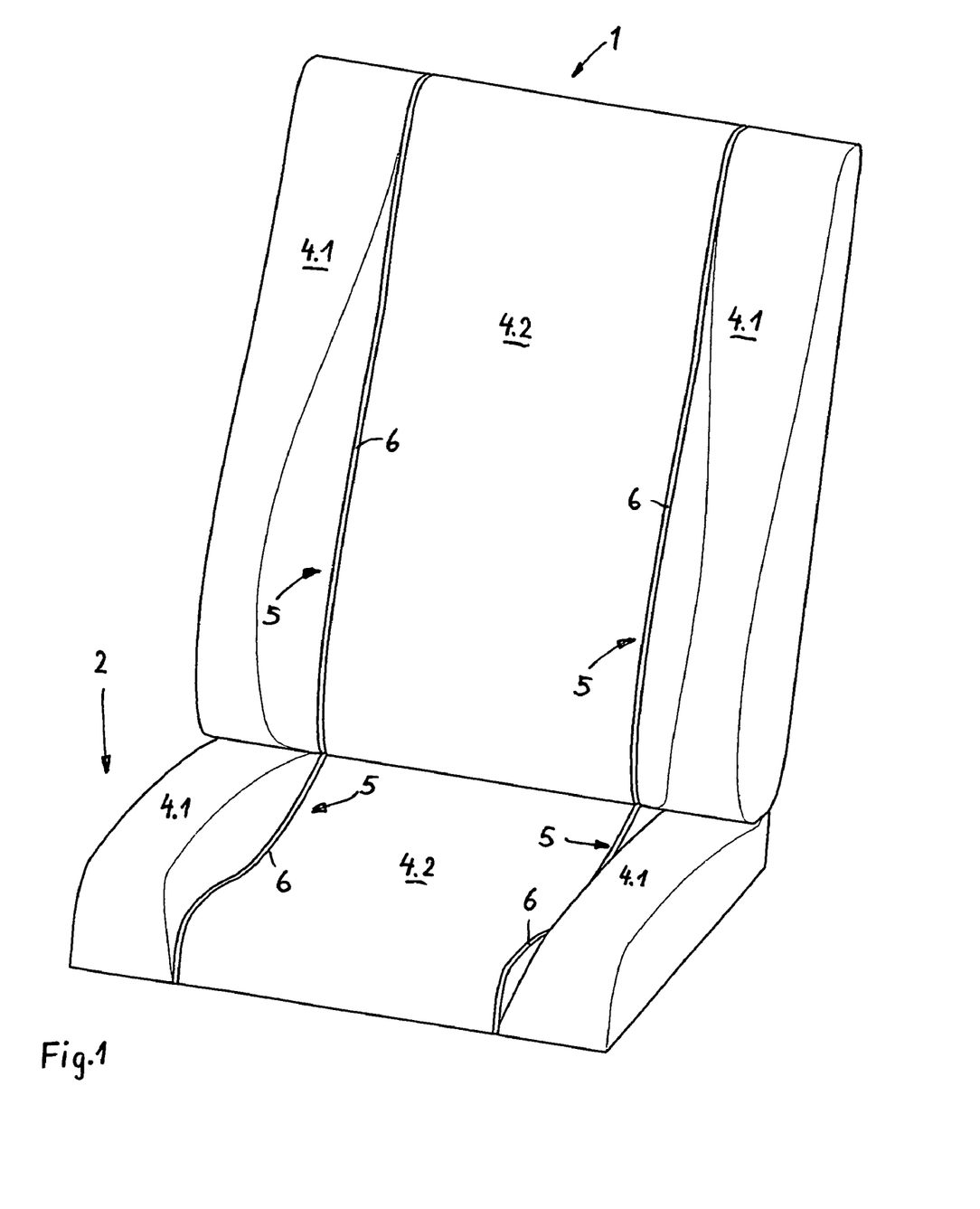
FIG. 1 is a schematic, perspective view at an angle from the front of the cushion sections of a vehicle seat in their use position.

In FIG. 1, only the cushions for a backrest 1 and a seat section 2 of a vehicle seat are shown. These each comprise a cushion body 3 and a cover 4 that covers these on the outside; i.e., on the surface on which a passenger in the seat rests. The cover 4 for the backrest 1 and the seat section 2 is cut into three panels: two side cushion cover pieces 4.1 and one medallion cover piece 4.2. The cover pieces 4.1 for the backrest 1 and the seat section 2 are each fastened to the medallion cover piece 4.2 by use of slide fasteners 6 at fastening points 5.

Figure 2:
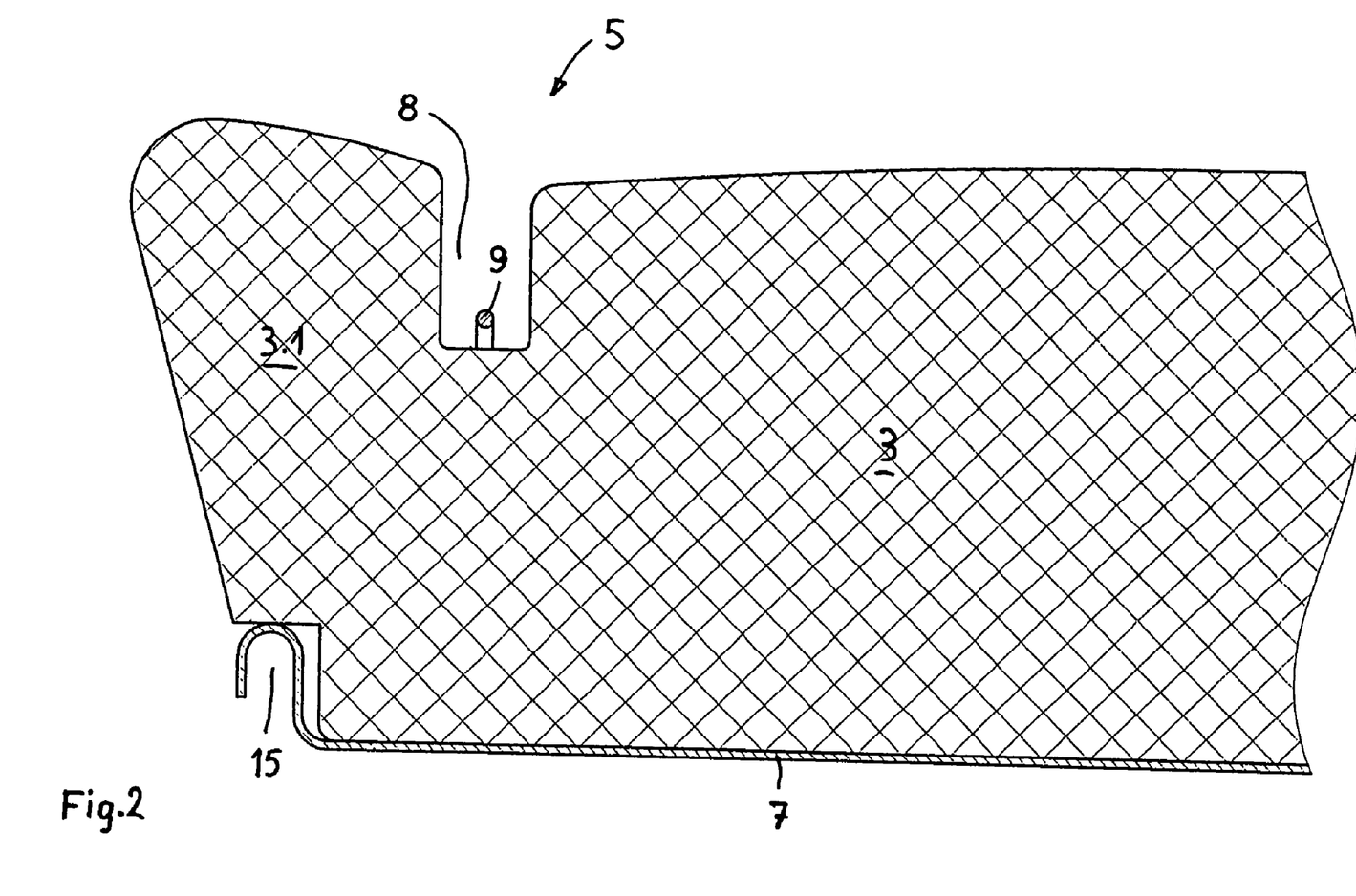
FIG. 2 is a partial section through the cushion body of the seat, without a cover, according to the first exemplary embodiment of the invention.

FIG. 2 shows a cushion body 3 that has not yet been covered. In this case the cushion body 3 for the seat section 2 is shown, the underside of which rests on a seat panel 7 made of plastic or sheet metal. The cushion body 3 for the backrest 1 is constructed based upon the same principle, so that the following specifications also apply to the cushion for the backrest 1.

Figure 3:
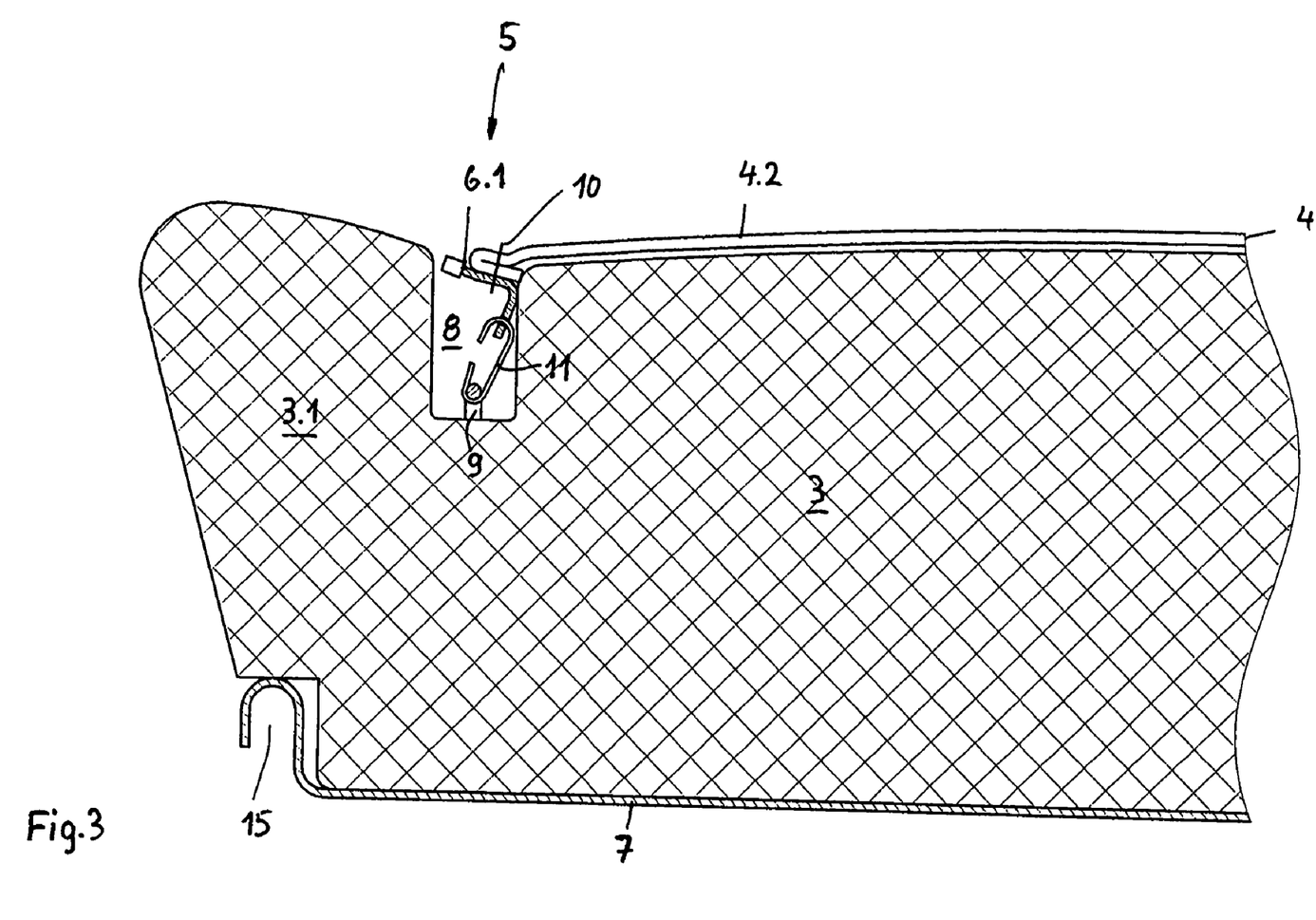
FIG. 3 is an illustration according to FIG. 2, with the medallion cover piece attached.

At the fastening points 5, mounting channels in the form of grooves 8 are provided in the cushion body 3. At the base of each groove a mounting element 9, for example in the form of a retaining clip, is foamed in, and which serves to fasten the medallion cover piece 4.2 to the cushion body 3. The medallion cover piece is attached along its longitudinal edges to a first half 6.1 of the slide fastener 6 by use of a seam 10. Upholstery clips 11 are hooked into the first half 6.1 of the slide fastener 6, which upholstery clips 11 are spaced from one another. To fasten the medallion cover piece 4.2, these upholstery clips 11 are hooked, in a tight connection, into the mounting element 9. The medallion cover piece 4.2 is thereby fastened to the cushion body 3. This position is shown in FIG. 3.

Figure 4:
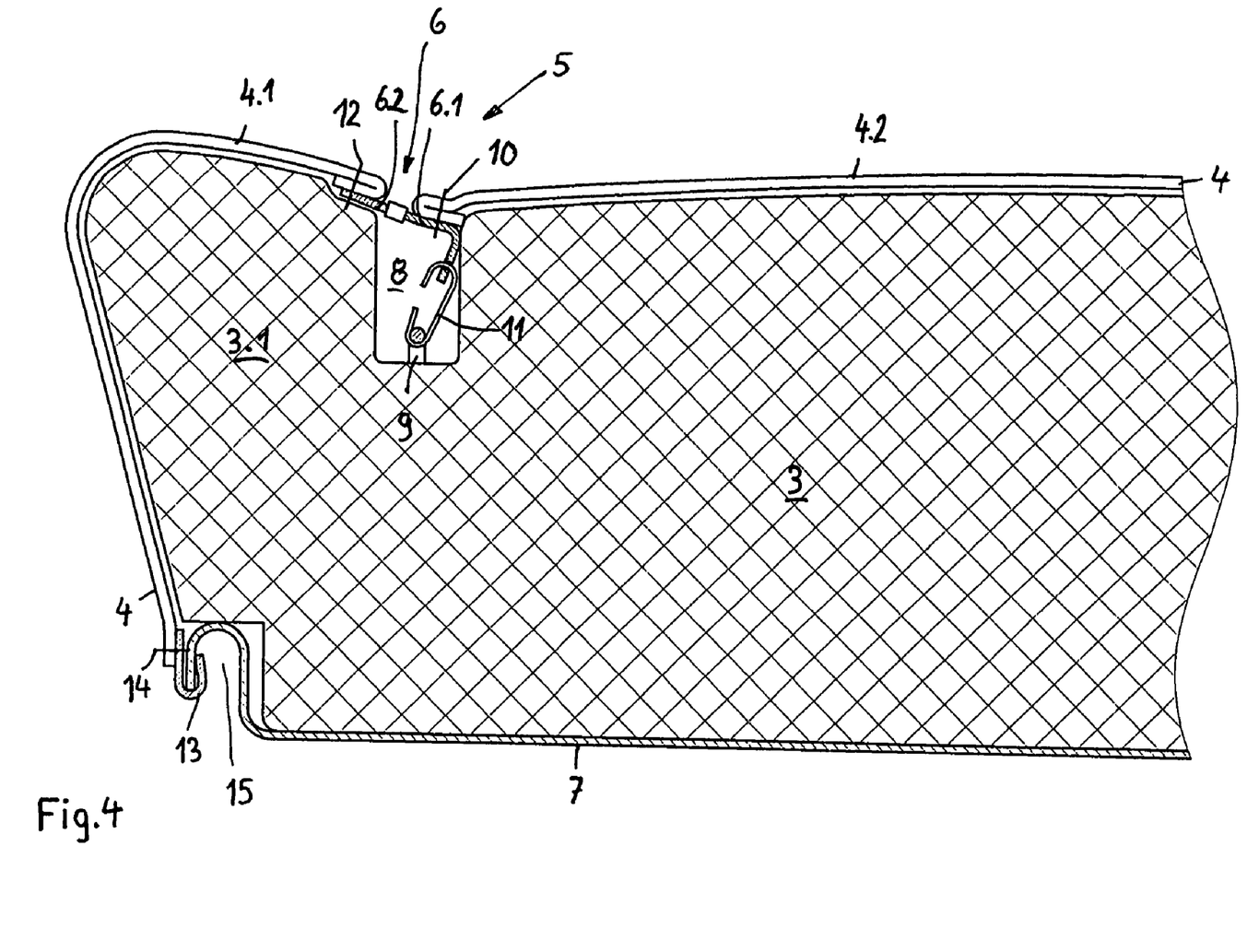
FIG. 4 is an illustration, according to FIG. 3, with the cover piece for the side cushion also attached.

Along one longitudinal edge of the side cushion cover piece 4.1, the second half 6.2 of the slide fastener 6 is attached by use of a seam 12. The attachment of the side cushion cover piece 4.1 to the medallion cover piece 4.2 is achieved in a simple manner by closing the slide fastener 6. Along the longitudinal edge of the side cushion cover piece 4.1 that is opposite the slide fastener, a J-profiled piece 13 is attached by use of a seam 14. To attach the side cushion cover piece 4.1 to the cushion body 3, the J-profiled piece 13 is hooked onto a gutter-like cushion channel 15 in the seat panel 7. This position is shown in FIG. 4. To replace the side cushion cover piece 4.1, it is necessary only to unhook the J-profiled piece 13 from the cushion channel 15 and to open the slide fastener 6. The medallion cover piece 4.2 can also be replaced. In order to accomplish this, the upholstery clips 11 must be unhooked from the mounting element 9 once the slide fastener 6 has been opened.

Figure 5:
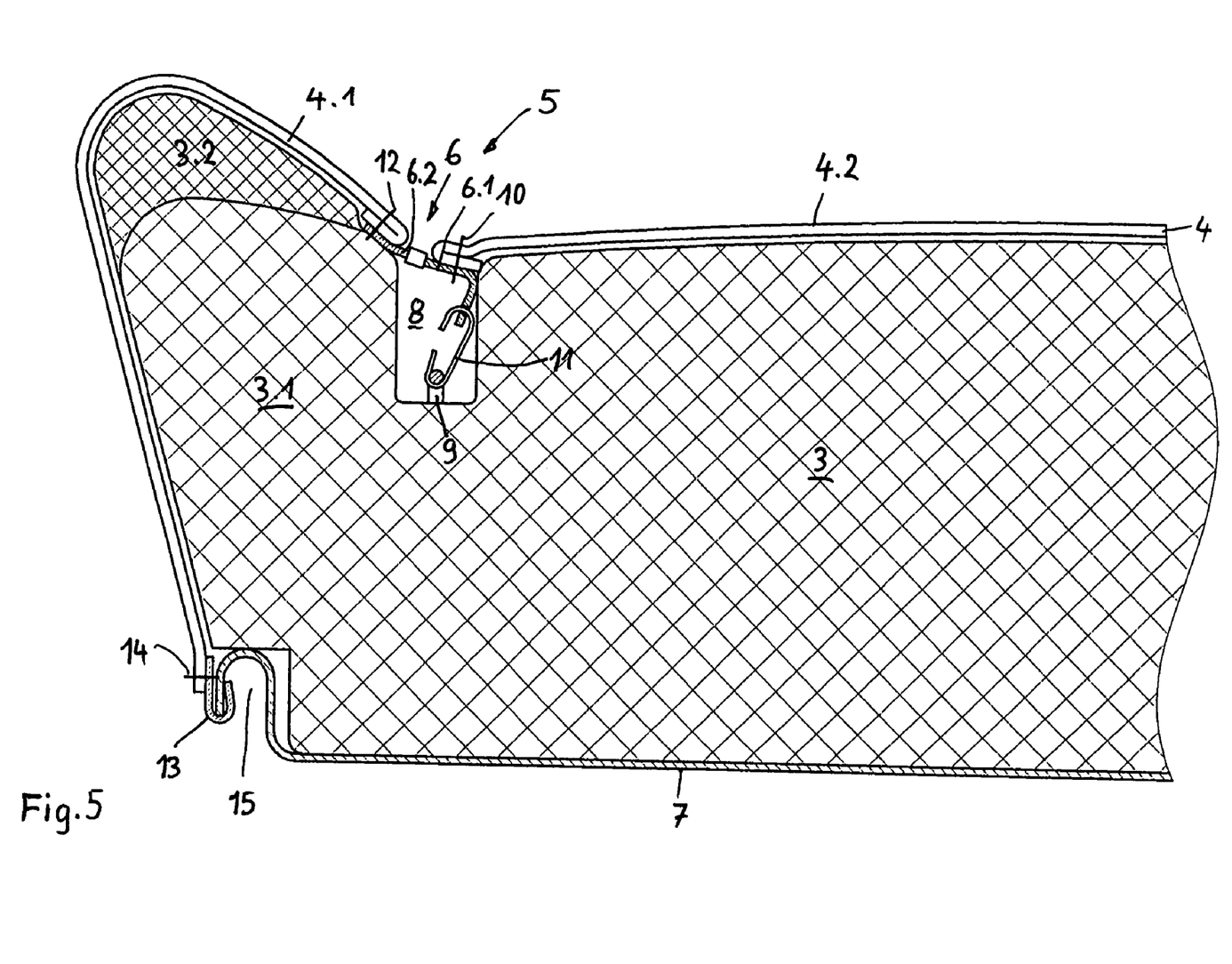
FIG. 5 is an illustration according to FIG. 4 of a second embodiment of the invention with a side cushion that has been modified with respect to its shape and/or hardness.

The exemplary embodiment shown in FIG. 5 differs from the embodiment detailed above in that the side cushion cover piece 4.1 has a side cushion structure 3.2 foamed in behind it, which, when the side cushion cover piece 4.1 is attached, lies, form-fitting, against the original side cushion 3.1. The hardness and the shape of the side cushion structure 3.2 may be varied. In this manner a standard vehicle seat can be converted, for example, to a bucket seat using the side cushion structure 3.2 shown in FIG. 5, if the foam padding of the side cushion structure 3.2 is chosen to be harder than that of the original side cushion body 3.1. Otherwise, the description made with respect to the exemplary embodiment described above applies to this exemplary embodiment.

Figure 6:
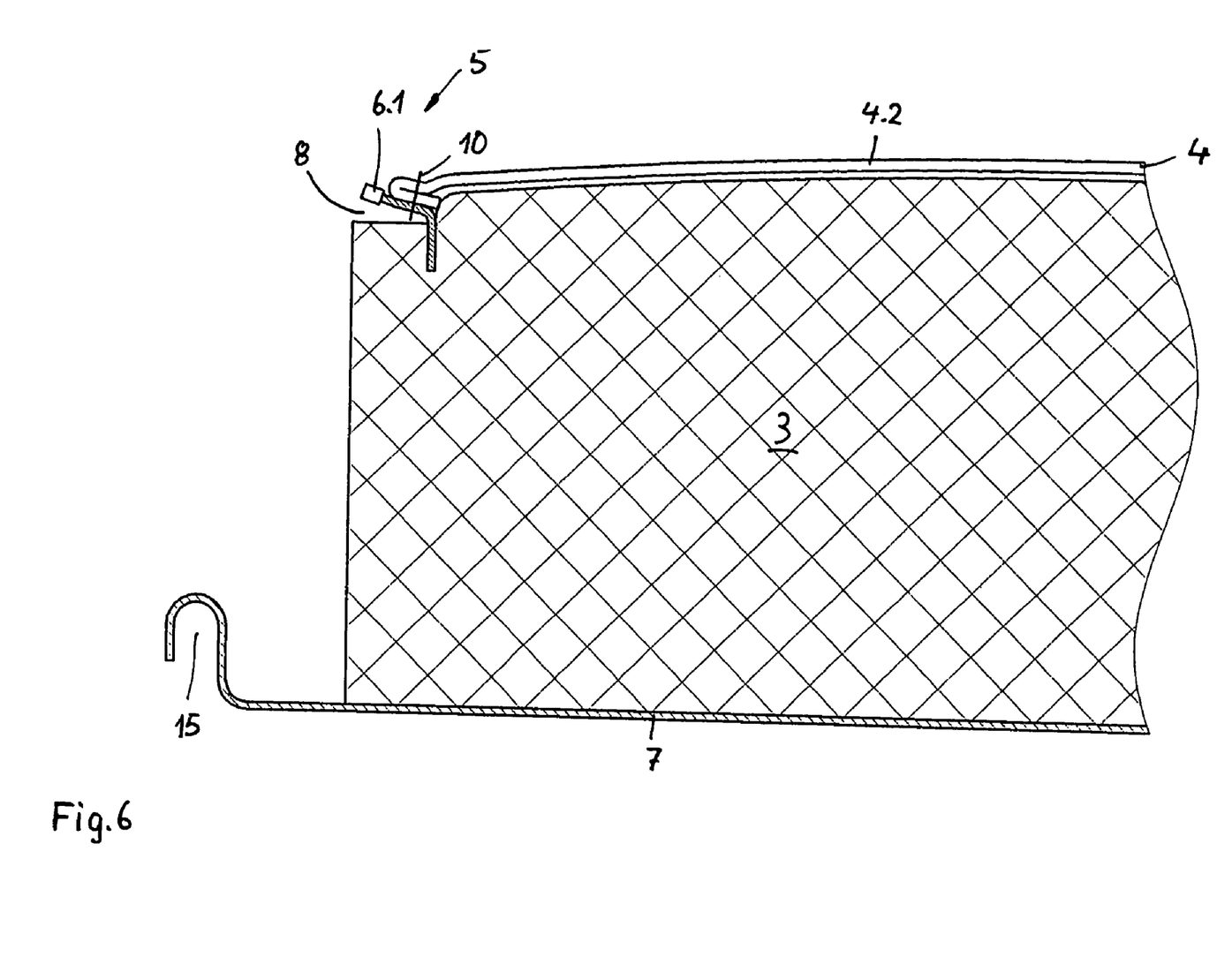
FIG. 6 is a cross-section of the cushion body of the seat portion of the vehicle seat according to a third embodiment of the present invention, with the medallion cover piece attached but with the side cushion not yet attached.
Figure 7:
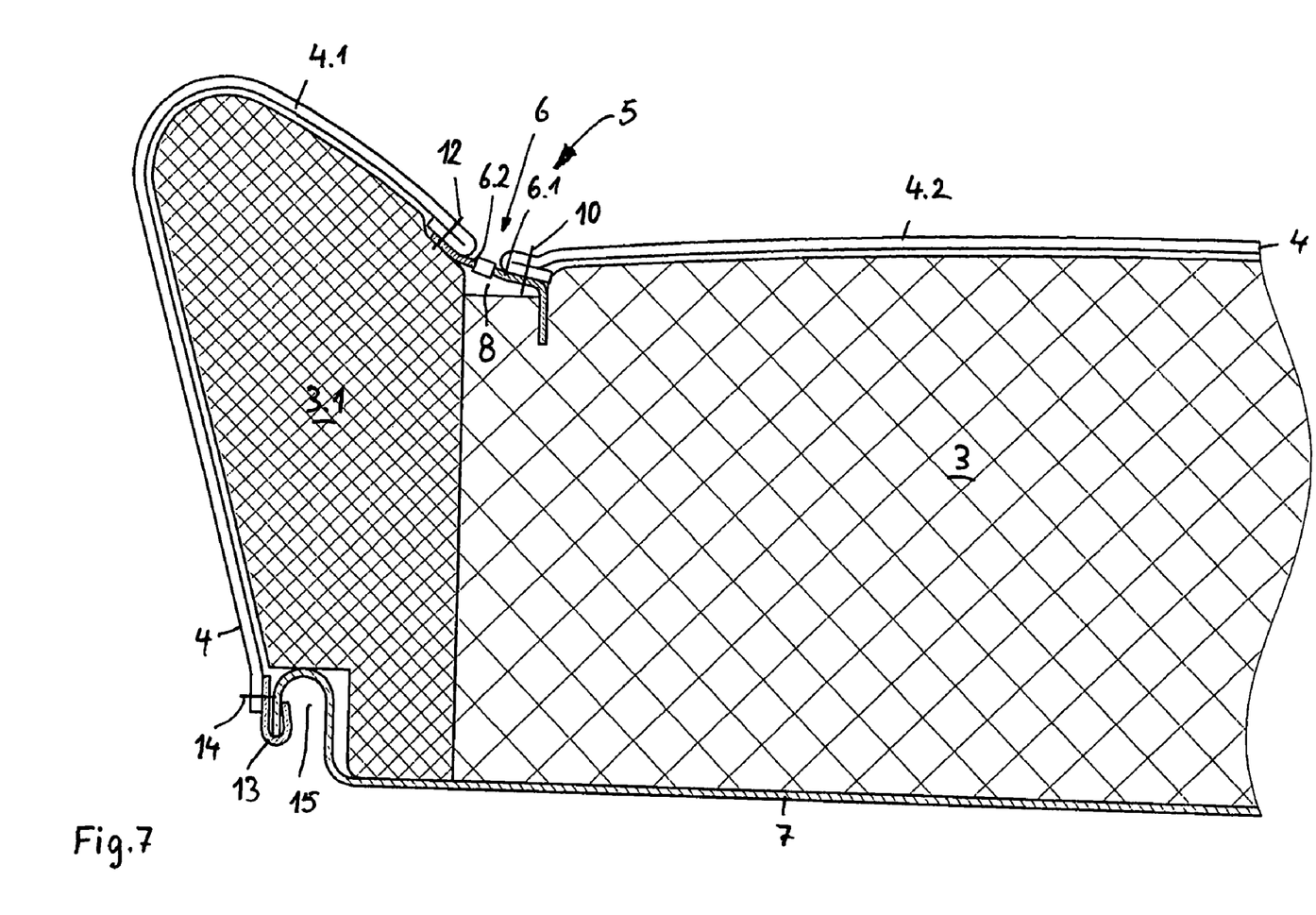
FIG. 7 is an illustration according to FIG. 6 with the side cushion attached.

In FIGS. 6 and 7, a further exemplary embodiment is shown. This embodiment has two important differences from the two exemplary embodiments discussed above. first, the first half 6.1 of the slide fastener 6 is foamed into the cushion body. Thus it is not possible to replace the medallion cover piece 4.2. second, the side cushion body 3.1 is completely foamed in behind the side cushion cover piece 4.1. Thus the cushion body 3.1 is not integrated into the cushion body 3, but rather forms a separate component. In this case as well, the character of the vehicle seat can be altered by modifying the shape and hardness of the foam padding of the side cushion body 3.1. Otherwise, the statements made with respect to the former exemplary embodiment detailed above apply.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

The invention claimed is:

1. Vehicle seat, comprising:
   a) a cushion body;
   b) a cover being attached to the cushion body;
   c) said cover including a first cover piece and a second cover piece;
   d) the first cover piece being attached to the second cover piece at attachment points;
   e) a groove being provided in the cushion body at the attachment points;
   f) the first cover piece and the second cover piece being attached to one another by use of a slide fastener;
   g) a first half of the slide fastener is attached to the first cover piece, and is fastened to the cushion body in the groove at the attachment points;
   h) a second half of the slide fastener is attached to the second cover piece; and
   i) the side cushion cover piece being separably hookable into a structure of the vehicle seat at an end opposite the slide fastener.

2. Vehicle seat according to claim 1, wherein:
   a) the first cover piece is a medallion cover piece;
   b) the second cover piece is a side cushion cover piece; and
   c) at least one of a side cushion structure and a side cushion of said cushion body is foamed in behind the side cushion cover piece.

3. Vehicle seat according to claim 2, wherein:
   a) the first half of the slide fastener is hooked into a mounting element that is foamed into the cushion body.

4. Vehicle seat according to claim 2, wherein:
   a) the first half of the slide fastener is foamed into the cushion body.

5. Vehicle seat according to claim 1, wherein:
   a) the first half of the slide fastener is hooked into a mounting element that is foamed into the cushion body.

6. Vehicle seat according to claim 1, wherein:
   a) the first half of the slide fastener is foamed into the cushion body.

7. Vehicle seat according to claim 1, wherein:
   a) said first cover piece is a medallion cover piece; and
   b) said second cover piece is a side cushion cover piece.

8. Vehicle seat according to claim 7, wherein:
   a) the first half of the slide fastener is hooked into a mounting element that is foamed into the cushion body.

9. Vehicle seat according to claim 7, wherein:
   a) the first half of the slide fastener is foamed into the cushion body.

* * * * *